(12) United States Patent
 Geis

(10) Patent No.: US 10,345,908 B2
(45) Date of Patent: Jul. 9, 2019

(54) INPUT DEVICE WITH MAGNETIC HAPTIC FEEDBACK AND ADJUSTMENT OPTION

(71) Applicant: PREH GMBH, Bad Neustadt a. d. Saale (DE)

(72) Inventor: Martin Geis, Mittelstreu (DE)

(73) Assignee: PREH GMBH, Bad Neustadt A. D. Saale (DE)

( * ) Notice: Subject to any disclaimer, the term of this patent is extended or adjusted under 35 U.S.C. 154(b) by 0 days.

(21) Appl. No.: 15/840,494

(22) Filed: Dec. 13, 2017

(65) Prior Publication Data

US 2018/0173310 A1    Jun. 21, 2018

(30) Foreign Application Priority Data

Dec. 21, 2016    (DE) .................. 10 2016 125 222

(51) Int. Cl.
| | |
|---|---|
| *G06F 3/01* | (2006.01) |
| *G05G 5/05* | (2006.01) |
| *G05G 9/047* | (2006.01) |
| *G05G 1/04* | (2006.01) |

(52) U.S. Cl.
CPC .............. *G06F 3/016* (2013.01); *G05G 5/05* (2013.01); *G05G 1/04* (2013.01); *G05G 2009/04748* (2013.01); *G05G 2009/04755* (2013.01)

(58) Field of Classification Search
CPC .................. G06F 3/016; G05G 5/05; G05G 2009/04748; G05G 2009/04755; G05G 1/04
See application file for complete search history.

(56) References Cited

U.S. PATENT DOCUMENTS

| | | | | |
|---|---|---|---|---|
| 3,646,583 | A * | 2/1972 | Scuderi ................. | B60Q 1/445 200/61.45 M |
| 4,093,912 | A * | 6/1978 | Double ................ | G01R 33/383 324/320 |
| 5,349,881 | A * | 9/1994 | Olorenshaw ............ | G05G 5/05 200/6 A |
| 6,545,662 | B1* | 4/2003 | Noll ...................... | G05G 9/047 345/158 |
| 6,755,195 | B1* | 6/2004 | Lemke .................. | G05G 25/04 128/849 |
| 9,946,293 | B2* | 4/2018 | Rubio ................... | G06F 3/0338 |

(Continued)

FOREIGN PATENT DOCUMENTS

| | | |
|---|---|---|
| DE | 202010009010 U1 | 2/2011 |
| DE | 102010042586 A1 | 5/2011 |

*Primary Examiner* — Nay Tun
(74) *Attorney, Agent, or Firm* — M&B IP Analysts, LLC

(57) ABSTRACT

The present disclosure relates to an input device, including: a base part, a support, a handle mounted to the support in a pivotably movable manner, a detector for detecting the position of the handle and at least one magnet pair of one first magnet associated with the handle means and a second magnet associated with the base part, wherein the first magnet and the second magnet, at least in one position of the handle, are disposed spaced apart over an air gap (d) and opposite to each other, in order to cause a haptic feedback and/or a returning action during the operation of the handle, wherein adapting means are provided for adapting the clear distance between the first magnet and the second magnet of the magnet pair by adapting the adapting means.

8 Claims, 1 Drawing Sheet

(56) References Cited

U.S. PATENT DOCUMENTS

| | | | |
|---|---|---|---|
| 2006/0124438 A1* | 6/2006 | Bader | H01H 25/002 200/6 A |
| 2008/0202278 A1* | 8/2008 | Klossek | G05G 5/03 74/504 |
| 2010/0265176 A1* | 10/2010 | Olsson | G05G 5/05 345/161 |
| 2013/0147642 A1* | 6/2013 | Rubio | G06F 3/0338 341/20 |
| 2014/0373701 A1* | 12/2014 | Yaron | G10H 3/143 84/726 |

* cited by examiner

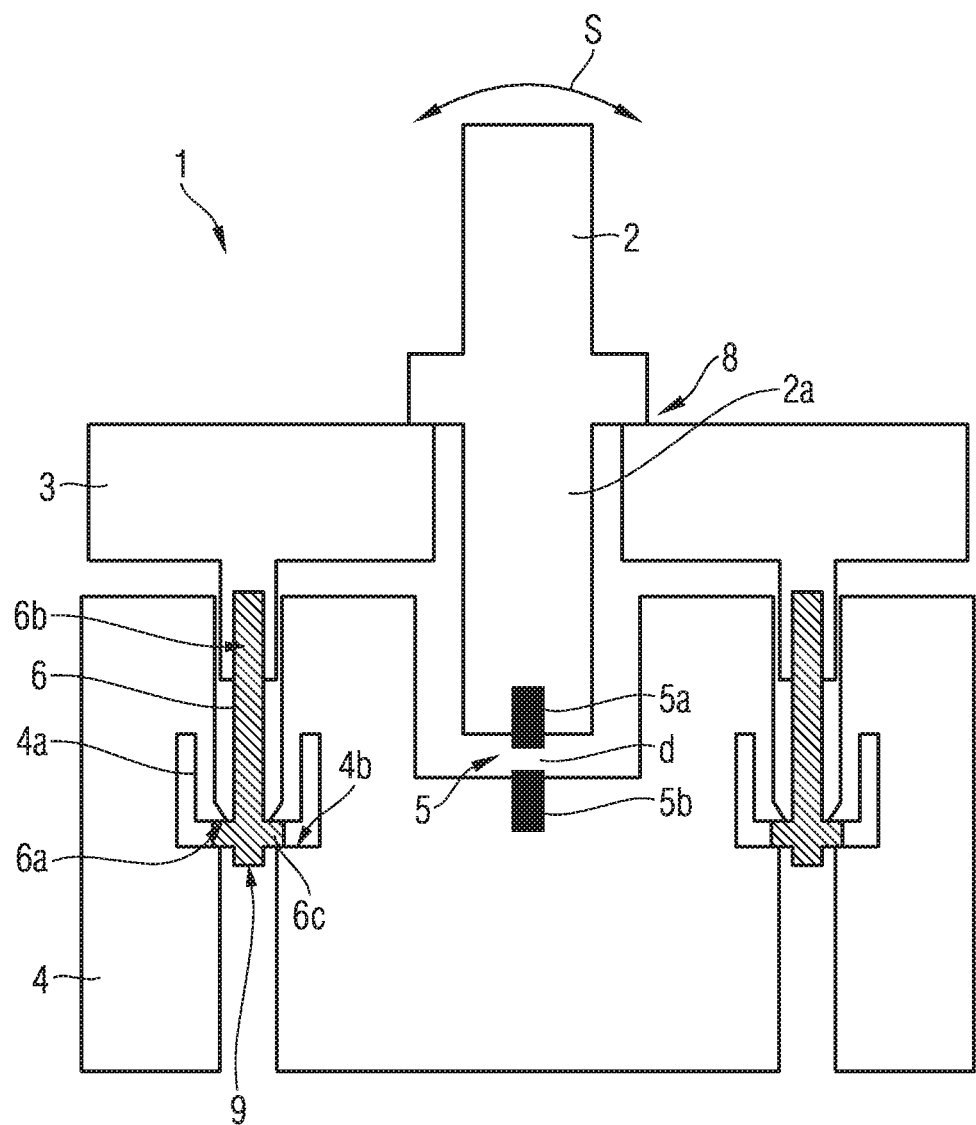

INPUT DEVICE WITH MAGNETIC HAPTIC FEEDBACK AND ADJUSTMENT OPTION

This application claims priority to the German Application No. 10 2016 125 222.0, filed Dec. 21, 2016, now pending, the contents of which are hereby incorporated by reference.

The present disclosure relates to an input device comprising a base part, a support, a handling means mounted in a pivotably movable manner on the support. Generically, a means for detecting the position of the handling means are also provided. Further, at least one magnet pair of one first magnet associated with the handling means and a second magnet associated with the base part is provided, wherein the first and second magnets, at least in one position of the handling means, are disposed spaced apart over a clear distance and opposite to each other, in order to cause a haptic feedback and/or a return into a rest position during the operation of the handling means, due to the magnetic interaction of the magnets.

Such an input device is known from DE 10 2006 002 634 A1 and DE 10 2012 222 237 A1, for example. In order to obtain the magnetic interaction, the opposing magnets are disposed at a minimum distance of a few tenths of a millimeter, for example. This places a high demand on manufacturing tolerance. Furthermore, there is the risk that, if there is a contact with the magnets during assembly, they lose their predefined position and/or are plastically deformed due to the contact, so that the desired returning action or the haptic feedback are not realized. So far, the opposing magnets were glued to the handling means or the base part. A subsequent adjustment was thus impossible and the use of adhesive in the manufacturing process necessitates a high maintenance expenditure with respect to the manufacturing plant.

Against this background, there was a need for a solution for an input device with a, in comparison, simplified assembly, particularly avoiding a risk of incorrect assembly jeopardizing manufacturing quality. This object is achieved with an input device according to claim 1. An equally advantageous use is the subject matter of the independent use claim. A correspondingly advantageous assembly method is the subject matter of the independent method claim. Advantageous embodiments are in each case the subject matter of the dependent claims. It must be noted that the features cited individually in the claims can be combined with each other in any technologically meaningful manner and represent other embodiments of the present disclosure. The description, in particular in connection with the figures, additionally characterizes and specifies the present disclosure.

The present disclosure relates to an input device, in particular for a motor vehicle. The input device according to the present disclosure comprises a base part and a support. The terms "base part" and "support" are not to be understood to be limiting and merely serve for distinguishing the two components, wherein, according to the present disclosure, the support is supposed to differ from the base part in that a handling means as a further component of the input device according to the present disclosure is mounted on the support in a pivotably movable manner either directly or via a bearing means. For example, but not necessarily, the base part is disposed underneath the support from the view of the operator, given an arrangement as intended of the input device, in which the handling means points in the direction of the operator.

According to the present disclosure, a means for detecting the position of the handling means is also provided. Also in this respect, the present disclosure is not limited; however, the means is preferably provided that detects the position in a contactless manner, e.g. optically, capacitively or inductively.

According to the present disclosure, at least one magnet pair of one first magnet associated with the handling means and a second magnet associated with the base part is further provided. In this case, the first and second magnets, at least in one position of the handling means, are disposed spaced apart over a clear distance of desirably, for example, a few tenths of a millimeter, and opposite to each other, in order to cause a haptic feedback and/or a return into a rest position, e.g. a monostable rest position, during the operation of the handling means. Preferably, the first and second magnets are each a permanent magnet. Preferably, they are orientated so that unlike poles oppose each other in said position; preferably, the two poles of the first magnet are opposite to unlike poles of the second magnet in that position. For example, the first magnet is attached to a free end of a cantilever of the handling means protruding over the pivot axis. For example, the cantilever constitutes an extension of the visible part of the handling means, i.e. the part facing towards the operator, extending in the extending direction of the handling means. For example, the magnet pair is provided and disposed to define a monostable rest position of the handling means.

According to the present disclosure, an adapting means is further provided for adapting the clear distance, i.e. the air gap, between the first and second magnets. Thus, manufacturing tolerances may be compensated. Preferably, the adapting means form a preferably adaptable screw connection disposed between the support and the base part. More preferably, the adapting means form a screw connection with the support in order to be able to pre-orientate the adapting means relative to the support. According to a preferred embodiment, the adapting means form a latching connection disposed between the support and the base part. More preferably, the latching connection is provided between the base part and the adapting means. According to a preferred embodiment, the latching connection is configured so as to actuate free of play.

According to a preferred embodiment, the adapting means have several screws screwed to the support and respectively forming a collar-like projection, wherein the collar-like projections are in each case fixed to the base part via latching projections formed on the base part, while forming the above-mentioned latching connection. For example, the screws further have an engagement contour for engagement with an associated adapting tool.

According to a preferred embodiment, the adapting means respectively cooperate with a stop face formed on the base part for limiting the convergence of the first and second magnets. An inadvertent contact with the first and second magnets of the magnet pair during, but also after, assembly is thus prevented in order to preclude the risk of a displacement of or surface damage to the magnets and a resultant adverse effect on the haptic feedback or the magnetic returning action.

Furthermore, the present disclosure relates to the use of the input device in one of its above-described embodiments in a motor vehicle.

The present disclosure further relates to an assembly method of an input device with the following steps: In a first providing step, a support is provided. In a subsequent attaching step, a handling means is attached to the support so that the former is mounted on the support in a pivotably movable manner. According to the present disclosure, at least one first magnet of a magnet pair of the first and second magnets is attached to the handling means. In a subsequent step, the adapting means are attached to the support by means of an adaptable screw connection, which facilitates a pre-adjustment. In a subsequent step, a base part is attached to the adapting means via a latching connection, wherein the second magnet is disposed on the base part in such a way that in one position of the handling means, the first magnet and the second magnet are disposed spaced apart over a clear distance, i.e. an air gap, and opposite to each other. In a subsequent adjusting step, the adapting means are adapted in order to set a predefined clear distance between the first magnet and the second magnet.

According to a preferred embodiment of the assembly method, the adapting means have several screws screwed to the support and respectively forming a collar-like projection, wherein the collar-like projections are in each case fixed to the base part via latching projections formed on the base part, while forming the above-mentioned latching connection. For example, the screws further have an engagement contour for engagement with an adapting tool.

According to a preferred embodiment of the assembly method according to the present disclosure, the adapting means respectively cooperate with a stop face formed on the base part for limiting the convergence of the first and second magnets. An inadvertent contact with the first and second magnets of the magnet pair during, but also after, assembly is thus prevented in order to preclude the risk of a displacement of or surface damage to the magnets and a resultant adverse effect on the haptic feedback or the magnetic returning action.

According to another preferred embodiment of the method, it is provided that the clear distance between the first and second magnets, and thus their convergence or divergence, is optically monitored during the adjusting adaptation. For example, the distance is monitored by an imaging method.

The present disclosure is explained in more detail with reference to the following FIGURE. The FIGURE is to be understood only as an example and merely represents a preferred embodiment. In the drawing:

FIG. 1 shows a sectional view through an embodiment of the input device 1 according to the present disclosure.

The input device 1 according to the present disclosure is intended for use in a motor vehicle that is not shown, and is disposed, for example, in a center console or a dashboard that is part of the vehicle. The input device according to the present disclosure 1 comprises a base part 3 and a support 4. The support 3 is provided for supporting a handling means 2 as a further component of the input device 1 according to the present disclosure in a pivotably movable manner in the pivoting direction S by means of bearing means 8 on the support 4 provided for this purpose. For example, but not necessarily, the base part 4 is disposed underneath the support 3 from the view of the operator, given an arrangement as intended of the input device 1, in which the handling means 2 points in the direction of the operator. According to the present disclosure, means, which are not shown, for optically detecting the position of the handling means 2 are also provided.

According to the present disclosure, at least one magnet pair 5 of one first magnet 5a attached to the handling means 2 and a second magnet 5b attached to the base part 4 is further provided. The first magnet 5a and the second magnet 5b, at least in one position, e.g. the rest position, of the handling means 2, are disposed at a clear distance d, i.e. forming an air gap, and opposite to each other, in order to cause a haptic feedback and a return into the rest position shown during the operation, i.e. the manual pivoting, of the handling means 2, due to the magnetic interaction between the first magnet 5a and the second magnet 5b. Preferably, the first magnet 5a and the second magnet 5b are each a permanent magnet. The first magnet 5a is attached to a free end of a cantilever 2a of the handling means 2 protruding over the pivot axis. The cantilever 2a constitutes an extension of the visible part of the handling means 2 extending in the extending direction of the handling means 2. Further, the input device 1 has adapting means 6 in the form of screws, which form an adaptable screw connection 6b with the support 3 by means of their threaded ends. The screw head of the screws 6 is in each case provided with a collar-like projection 6c that is inserted into a through-hole of the base part 4 and forms a latching connection 6a with the base part 4 by a latching projection 4a formed on the base part 4 reaching behind the collar-like projection 4b, thus fixing the collar-like projection 4b in a manner free of play and in contact with a contact surface 4b formed on the base part 4, while adapting the screw 6 is made possible by a tool which is inserted through the further extent of the through-hole, is brought into engagement with an engagement contour 6c of the screw head and is not shown.

This adaptation by turning the screw 6 changes the depth of the engagement of the respective screw 6 in the support 3 and varies the extent of protrusion of the collar-like projection 6c over the support, whereby the distance between the support 3 and the base part 4, and thus the clear distance between the first magnet 5a and the second magnet 5b, but also, due to the plurality of the screws 6, the relative orientation between the first magnet 5a and the second magnet 5b, can be changed. The assembly method according to the present disclosure is described below with reference to the above-described embodiment.

The support 3 is provided in a first providing step. In a subsequent attaching step, the handling means 2 is attached to the support so that the former is mounted on the support 3 in a pivotably movable manner in the pivoting direction S via the bearing means 8. According to the present disclosure, at least one first magnet 5a of the magnet pair 5 of the first magnet 5a and the second magnet 5b, which will be described later, is attached to the handling means 2.

In a subsequent step, the adapting means 6 in the form of four screws are attached by screwing to the support 3 by means of an adaptable screw connection, whereby a pre-adjustment is carried out. In a subsequent step, the base part carrying the second magnet 5b is attached to the adapting means 6, in this case screws, via a latching connection 6a, wherein the second magnet 5b is disposed on the base part 4 in such a way that in the depicted position of the handling means 2, the first magnet 5a and the second magnet 5b are disposed spaced apart over a clear distance d and opposite to each other. In a subsequent adjusting step, the adapting means are adapted, in this case, the screws are turned, in order to set a predefined clear distance between the first magnet 5a and the second magnet 5b. It is provided that the clear distance d between the first magnet 5a and the second magnet 5b, and thus their convergence and/or divergence caused by the adaptation, is optically monitored during the adjusting adaptation. For example, the distance is monitored by an imaging method, e.g. by means of a camera. Then, the screws 6 can be secured against being displaced by means of an adhesive or a screw-securing paint.

The invention claimed is:

1. A magnetic haptic feedback device comprising:
a base part, a support, a handle mounted to the support in a pivotably movable manner, a detector for detecting the position of the handle, and at least one magnet pair including a first magnet associated with the handle and a second magnet associated with the base part;
wherein the first magnet and the second magnet, at least in one position of the handle, are disposed spaced apart over an air gap (d) and opposite to each other, in order to cause a haptic feedback or a returning action during the operation of the handle, wherein an adapting means is provided for adapting the air gap (d) between the first magnet and the second magnet of the magnet pair by adapting the adapting means; and
wherein the adapting means has several screws screwed to the support and each respectively forming a collar-like projection, and the collar-like projections are in each case fixed to the base part via latching projections formed on the base part.

2. The device of claim 1, wherein the adapting means forms a screw connection disposed between the support and the base part.

3. The device of claim 1, wherein the adapting means forms a latching connection between the support and the base part.

4. The device of claim 1, wherein the adapting means respectively cooperate with a stop face formed on the base part for limiting the convergence of the first magnet and the second magnet.

5. The device of claim 1, wherein the device is configured for use in a motor vehicle.

6. An assembly method of an input device with the following steps:
attaching a handle to a support so that the handle is mounted on the support in a pivotably movable manner, wherein at least one first magnet is attached to the handle, wherein the first magnet is of a magnet pair of the first magnet and a second magnet;
attaching an adapting means to the support via a screw connection;
attaching a base part to the adapting means via a latching connection, wherein the second magnet is disposed on the base part in such a way that in one position of the handle, the first magnet and the second magnet are disposed spaced apart over an air gap (d) and opposite to each other; and
adjusting by adapting the adapting means in order to set a predefined air gap (d) between the first magnet and the second magnet; and
wherein the adapting means comprises one or more screws with one collar-like projection each, and the collar-like projections are in each case fixed to the base part via latching projections formed on the base part.

7. The method of claim 6, wherein the adapting means respectively cooperate with a stop face formed on the base part for limiting the convergence of the first magnet and the second magnet.

8. The method of claim 6, wherein the air gap (d) between the first magnet and second magnet is optically monitored during the adjustment.

* * * * *